United States Patent
Geckler et al.

(10) Patent No.: US 10,450,973 B2
(45) Date of Patent: Oct. 22, 2019

(54) TECHNIQUES FOR CONTROLLING A DEDICATED EGR ENGINE

(71) Applicant: Cummins Inc., Columbus, IN (US)

(72) Inventors: Samuel C. Geckler, Columbus, IN (US); Madhuri Gandikota, Columbus, IN (US); Rajkumar Subramanian, Columbus, IN (US); Axel Otto zur Loye, Columbus, IN (US)

(73) Assignee: Cummins Inc., Columbus, IN (US)

( * ) Notice: Subject to any disclaimer, the term of this patent is extended or adjusted under 35 U.S.C. 154(b) by 165 days.

(21) Appl. No.: 15/479,448

(22) Filed: Apr. 5, 2017

(65) Prior Publication Data

US 2017/0204797 A1    Jul. 20, 2017

Related U.S. Application Data

(60) Division of application No. 14/582,895, filed on Dec. 24, 2014, now Pat. No. 9,631,582, which is a
(Continued)

(51) Int. Cl.
*F02D 41/30* (2006.01)
*F02D 41/00* (2006.01)
(Continued)

(52) U.S. Cl.
CPC ......... *F02D 41/0065* (2013.01); *F02B 75/02* (2013.01); *F02B 75/04* (2013.01);
(Continued)

(58) Field of Classification Search
CPC ............. F02D 41/0065; F02D 41/0072; F02D 41/1446; F02D 41/30; F02D 41/0077;
(Continued)

(56) References Cited

U.S. PATENT DOCUMENTS

| 4,143,635 A | 3/1979 | Iizuka et al. |
| 4,386,597 A | 6/1983 | Ootaka et al. |

(Continued)

FOREIGN PATENT DOCUMENTS

| WO | 2007027327 A2 | 3/2007 |
| WO | 2010116064 A1 | 10/2010 |

(Continued)

OTHER PUBLICATIONS

English Translation of Chinese Office Action, Chinese Application No. 201380042708.7 dated Feb. 23, 2017, 3 pgs.
(Continued)

*Primary Examiner* — Hai H Huynh
(74) *Attorney, Agent, or Firm* — Taft Stettinius & Hollister LLP

(57) ABSTRACT

A system includes an internal combustion engine having a number of cylinders, with at least one of the cylinders plumbed to have a complete recycle of the exhaust gases from the cylinder. The system further includes the completely recycled cylinder having an EGR stroke cycle, and the non-recycled cylinders of the engine having an exhaust stroke cycle. The system includes the EGR stroke cycle being distinct from the exhaust stroke cycle. An amount and composition of the exhaust gases from the recycled cylinder are distinct from the amount and composition of the exhaust gases from the non-recycled cylinders, at least at certain operating conditions of the engine.

34 Claims, 5 Drawing Sheets

Related U.S. Application Data continuation of application No. PCT/US2013/048786, filed on Jun. 28, 2013.

(60) Provisional application No. 61/665,679, filed on Jun. 28, 2012.

(51) Int. Cl.

| | |
|---|---|
| *F02D 41/06* | (2006.01) |
| *F02M 26/04* | (2016.01) |
| *F02M 26/43* | (2016.01) |
| *F02M 26/05* | (2016.01) |
| *F02M 26/33* | (2016.01) |
| *F02M 26/44* | (2016.01) |
| *F02M 26/71* | (2016.01) |
| *F02M 26/22* | (2016.01) |
| *F02B 75/02* | (2006.01) |
| *F02B 75/04* | (2006.01) |
| *F02D 13/02* | (2006.01) |
| *F02D 41/14* | (2006.01) |
| *F02D 41/40* | (2006.01) |
| *F02D 41/38* | (2006.01) |
| *F02M 26/16* | (2016.01) |
| *F02M 26/25* | (2016.01) |

(52) U.S. Cl.
CPC ....... *F02D 13/0223* (2013.01); *F02D 41/005* (2013.01); *F02D 41/008* (2013.01); *F02D 41/0077* (2013.01); *F02D 41/0087* (2013.01); *F02D 41/06* (2013.01); *F02D 41/1446* (2013.01); *F02D 41/30* (2013.01); *F02D 41/3058* (2013.01); *F02D 41/3094* (2013.01); *F02M 26/04* (2016.02); *F02M 26/05* (2016.02); *F02M 26/22* (2016.02); *F02M 26/33* (2016.02); *F02M 26/43* (2016.02); *F02M 26/44* (2016.02); *F02M 26/71* (2016.02); *F02B 2075/025* (2013.01); *F02B 2075/027* (2013.01); *F02D 41/064* (2013.01); *F02D 41/068* (2013.01); *F02D 41/3023* (2013.01); *F02D 41/401* (2013.01); *F02D 2041/389* (2013.01); *F02M 26/16* (2016.02); *F02M 26/25* (2016.02); *Y02T 10/47* (2013.01)

(58) Field of Classification Search
CPC .. F02D 41/0087; F02D 17/02; F02D 13/0223; F02M 26/43; F02M 26/46; F02B 75/02; F02B 75/04; F02B 2075/025; F02B 2075/027
USPC ............... 123/198 F, 568.21, 90.15; 701/108
See application file for complete search history.

(56) References Cited

U.S. PATENT DOCUMENTS

| | | | |
|---|---|---|---|
| 4,674,464 A | 6/1987 | Akagi | |
| 5,398,653 A | 3/1995 | Merritt | |
| 5,802,846 A | 9/1998 | Bailey | |
| 6,138,649 A | 10/2000 | Khai et al. | |
| 6,257,176 B1 | 7/2001 | Shimasaki et al. | |
| 6,286,489 B1 | 9/2001 | Bailey | |
| 6,386,154 B1* | 5/2002 | Hellman | F02D 13/0276 123/568.12 |
| 6,474,060 B2 | 11/2002 | Khair | |
| 6,655,324 B2 | 12/2003 | Cohn et al. | |
| 6,742,507 B2 | 6/2004 | Keefer et al. | |
| 6,877,492 B1 | 4/2005 | Osterwald | |
| 7,028,644 B2 | 4/2006 | Cohn et al. | |
| 7,036,465 B2 | 5/2006 | Burk et al. | |
| 7,389,771 B2 | 6/2008 | Andrews et al. | |
| 7,444,815 B2 | 11/2008 | Baumgard et al. | |
| 7,487,766 B2 | 2/2009 | Alger et al. | |
| 7,721,541 B2 | 5/2010 | Roberts, Jr. et al. | |
| 8,020,539 B2 | 9/2011 | Maunoury | |
| 8,036,810 B2 | 10/2011 | Schuckert et al. | |
| 8,103,428 B2 | 1/2012 | Russ et al. | |
| 8,146,572 B2 | 4/2012 | Macfarlane | |
| 8,291,891 B2* | 10/2012 | Alger, II | F02D 13/0238 123/315 |
| 8,316,829 B2* | 11/2012 | Piper | F02D 9/04 123/179.16 |
| 8,944,034 B2* | 2/2015 | Gingrich | F02B 27/0215 123/315 |
| 9,080,536 B2* | 7/2015 | Flynn | F02M 25/0722 |
| 9,194,307 B2 | 11/2015 | Geckler | |
| 9,410,504 B2* | 8/2016 | Gerty | F02M 26/41 |
| 9,518,519 B2* | 12/2016 | Dane | F02D 21/08 |
| 9,650,976 B2* | 5/2017 | Gingrich | F02M 26/43 |
| 2006/0037578 A1 | 2/2006 | Nakamura | |
| 2009/0063023 A1 | 3/2009 | Nagae | |
| 2009/0199790 A1 | 8/2009 | Cathcart et al. | |
| 2009/0308070 A1 | 12/2009 | Alger, II et al. | |
| 2010/0217503 A1 | 8/2010 | Leone et al. | |
| 2010/0300383 A1 | 12/2010 | Pursifull et al. | |
| 2011/0253113 A1 | 10/2011 | Roth et al. | |
| 2012/0023937 A1 | 2/2012 | Styles et al. | |
| 2012/0048244 A1 | 3/2012 | Hayman et al. | |
| 2012/0060497 A1 | 8/2012 | Roth | |
| 2012/0204844 A1 | 8/2012 | Gingrich et al. | |
| 2012/0260894 A1 | 10/2012 | Hayman | |
| 2014/0020382 A1* | 1/2014 | Subramanian | F02B 29/0406 60/605.2 |
| 2014/0202433 A1* | 7/2014 | Dane | F02D 41/0065 123/568.11 |
| 2014/0261322 A1* | 9/2014 | Geckler | F02D 41/0065 123/445 |
| 2015/0114341 A1 | 4/2015 | Geckler et al. | |
| 2016/0047341 A1 | 2/2016 | Styles | |
| 2016/0252054 A1* | 9/2016 | Dane | F02M 26/07 60/602 |

FOREIGN PATENT DOCUMENTS

| | | |
|---|---|---|
| WO | 2011025586 A1 | 3/2011 |
| WO | 2012039732 A1 | 3/2012 |

OTHER PUBLICATIONS

Chinese Office Action, Chinese Application No. 201380042708.7 dated Feb. 23, 2017, 9 pgs.
PCT/US2013/048786 International Search Report and Written Opinion, dated Dec. 13, 2013, 12 pgs.

\* cited by examiner

TECHNIQUES FOR CONTROLLING A DEDICATED EGR ENGINE

RELATED APPLICATIONS

The present application is a divisional of U.S. patent application Ser. No. 14/582,895 filed Dec. 24, 2014, which is a continuation of International Patent App. No. PCT/US2013/048786 filed on Jun. 28, 2013, which claims the benefit of the filing date of U.S. Provisional Patent Application 61/665,679 titled "TECHNIQUES FOR CONTROLLING A DEDICATED EGR ENGINE," filed on Jun. 28, 2012, each of which is incorporated herein by reference in the entirety for all purposes.

BACKGROUND

Engines operating with one or more cylinders as dedicated EGR cylinders enjoy greatly simplified controls and pressure management, fewer hardware devices, and other benefits. However, these simplifications come at the cost of a loss of control over the system, including a loss of control of the EGR fraction. When nominal cylinders are dedicated to providing EGR, and standard fueling and controls are applied, the EGR fraction provided by the cylinders is limited to the simple ratio of the number of EGR cylinders to the total number of cylinders. For example, an engine with one cylinder dedicated to EGR and four cylinders total will operate at a 25% EGR fraction if all of the cylinders are operated in the same manner. Additionally, an engine having dedicated EGR cylinders provides an opportunity for greater control over the temperature and composition of gases at the intake manifold, if a system could be developed to take advantage of this opportunity. Therefore, further technological developments are desirable in this area.

SUMMARY

One embodiment is a unique system for controlling a divided exhaust engine. Other embodiments include unique methods, systems, and apparatus to control divided exhaust engines. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
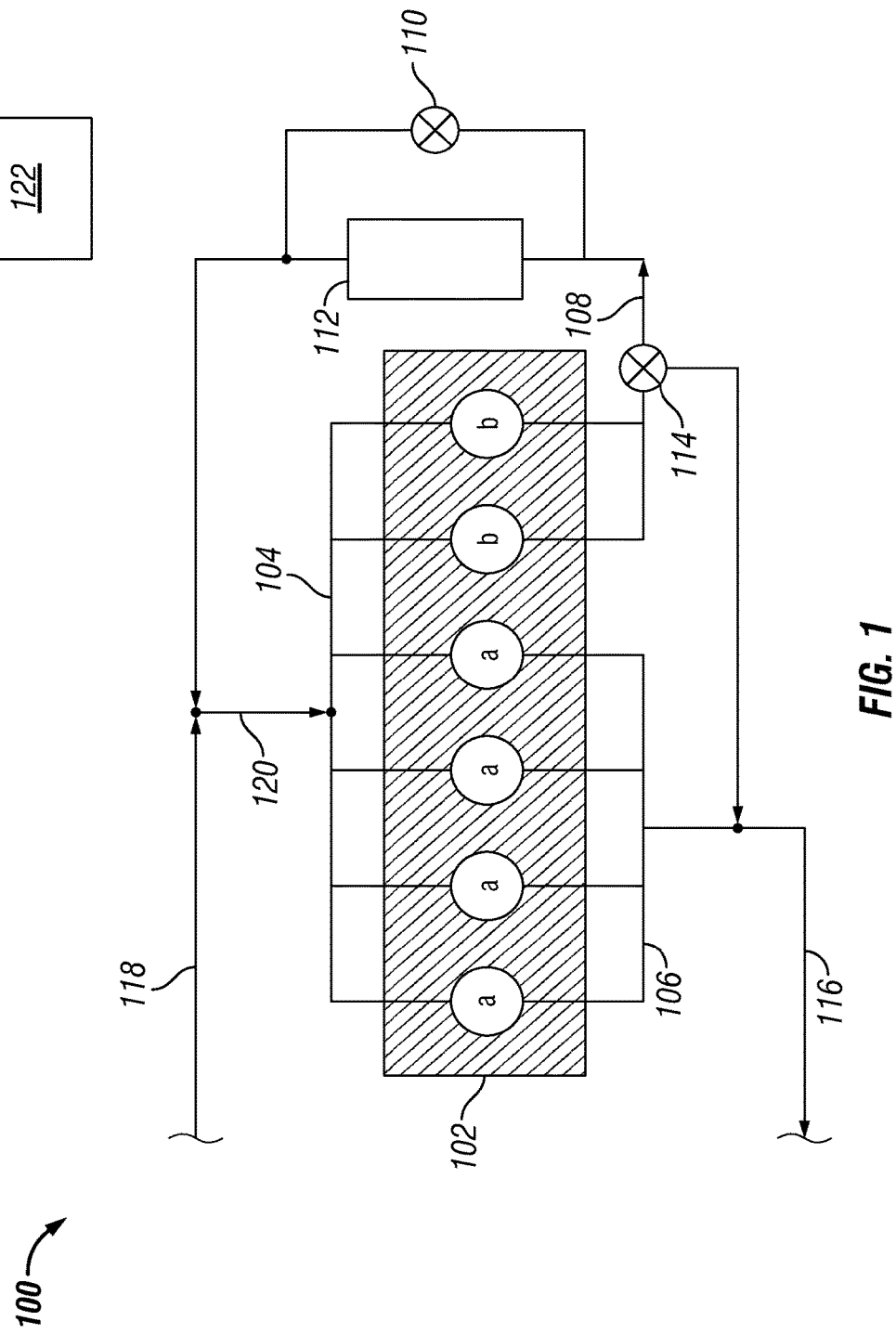
FIG. 1 is a schematic depiction of a system having an engine with selectively dedicated EGR cylinders.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 is depicted having an engine 102. The engine 102 is an internal combustion engine of any type, and can include a stoichiometric engine, a gasoline engine, and/or a natural gas engine. In certain embodiments, the engine 102 includes a lean combustion engine such as a lean burn gasoline engine or a diesel cycle engine. In certain embodiments, the engine 102 may be any engine type producing emissions that may include an exhaust gas recirculation (EGR) system, for example to reduce $NO_x$ emissions from the engine 102. The engine 102 includes a number of cylinders a, b. The number of cylinders may be any number, and the arrangement may be any arrangement. The system 100 includes an inline 6 cylinder arrangement for illustration.

The engine 102 includes dedicated EGR cylinders b, and cylinders a that are not dedicated to EGR. The term dedicated EGR, as utilized herein, should be read broadly. Any EGR arrangement wherein, during at least certain operating conditions, the entire exhaust output of certain cylinders is recirculated to the engine intake is a dedicated EGR cylinder. A dedicated EGR cylinder typically, at least during dedicated EGR operation, includes exhaust divided from one or more of the remaining cylinders that are not dedicated EGR cylinders.

In the system 100, the EGR gas 108 recirculates and combines with intake gases 118 at a position upstream of an intake manifold 104. The EGR gas 108 may combine with the intake gases 118 at a mixer (not shown) or by any other arrangement. In certain embodiments, the EGR gas 108 returns to the intake manifold directly. The EGR system may be a low-pressure loop, for example returning to the intake at a position upstream of a compressor (not shown), or a high-pressure loop, for example returning to the intake at a position downstream of a compressor and/or at the intake manifold. In certain embodiments, the system 100 does not include a compressor or any other type of boost pressure generating device. The example system 100 includes an EGR cooler 112 in the EGR loop 108, and an EGR cooler bypass valve 110 that selectively allows EGR flow to bypass the EGR cooler 112. The presence of an EGR cooler 112 and/or an EGR cooler bypass 110 is optional and non-limiting.

In certain embodiments, the dedicated EGR cylinders b include a direct injector (not shown) for fueling. A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder. In certain embodiments, the direct injector may be structured to inject fuel into a combustion pre-chamber, although in certain embodiments the dedicated EGR cylinders b do not include a combustion pre-chamber. Each dedicated EGR cylinder b may include one or more direct injectors. The direct injectors may be the primary or the only fueling device for the dedicated EGR cylinders b, or alternatively the direct injectors may be an auxiliary or secondary fueling device for the dedicated EGR cylinders b. In certain embodiments, the direct injectors are capable of providing all of the designed fueling amount for the dedicated EGR cylinders b at any operating condition. Alternatively, the direct injectors may be only partially capable, for example the direct injectors may be capable of providing a designated amount of fuel for a specific purpose, including any purpose described anywhere throughout the present disclosure.

In certain embodiments, the system 100 includes a controller 122 structured to perform certain operations to control a dedicated EGR engine. In certain embodiments, the controller 122 forms a portion of a processing subsystem including one or more computing devices having memory, processing, and communication hardware. The controller 122 may be a single device or a distributed device, and the functions of the controller 122 may be performed by hardware or software. The controller 122 may be included within, partially included within, or completely separated from an engine controller (not shown). The controller 122 is in communication with any sensor or actuator throughout the system 100, including through direct communication, communication over a datalink, and/or through communication with other controllers or portions of the processing subsystem that provide sensor and/or actuator information to the controller 122.

In certain embodiments, the controller 122 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Certain systems are described following, and include examples of controller operations in various contexts of the present disclosure. In certain embodiments, the controller 122 interprets a warmup condition, and in response to the warmup condition the controller 122 provides a warmup operation command. The warmup conditions includes any condition understood in the art that may indicate that the engine 102 and/or an aftertreatment component downstream of the engine (not shown) is below a temperature value and a temperature increase may be desirable and/or required. Example and non-limiting warmup conditions include a cold start condition, a low catalyst temperature condition, a low engine temperature condition, a low engine coolant temperature condition, and a low engine oil temperature condition. A low engine temperature condition may be any temperature value indicating, or providing an inferable indication, that the engine may be cooler than a nominal operating temperature. Non-limiting examples include a turbine temperature, an ambient air temperature, and/or an elapsed time since a previous shutdown operation.

The system 100 includes the direct injector being responsive to the warmup operation command. Example and non-limiting responses to the warmup operation command include providing a retarded ignition timing, a rich operating condition, injection conditions that provide favorable species for combustion (e.g. highly rich operation producing $H_2$ or CO). In certain additional or alternative embodiments, responses to the warmup operation command include a retarded injection timing, a stratified injection timing, a predetermined rich fueling amount, and/or a predetermined injection timing (and/or fueling amount) determined to produce a desired amount of one of $H_2$, unburned HC, and CO. Without limitation to a specific theory of operation, the system 100 including a specific response in the dedicated EGR cylinders provides significant advantages over a conventional engine that may provide retarded timing or other warm-up techniques. Compositional components, as well as induced thermal energy, provided by the dedicated EGR cylinders are returned entirely and immediately to the engine intake for utilization in all of the cylinders. This provides a rapid positive feedback that can greatly enhance the speed of warm-up operations and significantly reduce the net emissions impact of a cold start condition.

In certain embodiments, a dedicated EGR cylinder b is a selectively dedicated EGR cylinder. For example, referencing FIG. 1, a three-way valve 114 provides the dedicated EGR cylinder b flow to the EGR stream 108, to the exhaust stream 116, and/or in a selected ratio to both streams 108, 116. The provision for selectively dedicated EGR cylinders is optional and non-limiting. In certain embodiments, the selectively dedicated EGR cylinders are operated as dedicated EGR cylinders during warmup operations.

The system 100 includes the non-dedicated EGR cylinders a (cylinders that do not participate in EGR at all, or that only a portion of exhaust gases participate in EGR—not shown). The non-dedicated EGR cylinders a may be port fuel injected, and/or may not include direct injection at all. In certain embodiments, operations during the warmup condition include the dedicated EGR cylinders b and the non-dedicated EGR cylinders a operating at distinct AFR values. In one example, the dedicated EGR cylinders operate at a richer condition than the non-dedicated EGR cylinders during warmup operations. In certain embodiments, the dedicated EGR cylinders operate at a leaner condition than the non-dedicated EGR cylinders during warmup operations.

In certain embodiments, the system 100 includes the dedicated EGR cylinders a further having a port fuel injector. In certain additional embodiments, the port fuel injector for the dedicated EGR cylinders is not active during the warmup condition. Alternatively, the port fuel injector may provide some fuel during the warmup condition, and the direct injector provides an additional amount of fuel beyond fuel provided by the port fuel injector during the warmup condition. In certain further embodiments, the intake of the dedicated EGR cylinder is fluidly isolated from the non-dedicated EGR cylinders of the engine. For example, the intake manifold 104 may be divided (not shown), or the port fuel injectors may be positioned such that no other cylinder in the system 100 is downstream of the port fuel injector, i.e. only the target cylinder is downstream of the port fuel injector.

In certain embodiments, the controller 122 provides a transition operation command in response to the end of the warmup condition, and/or the approaching end of the warmup condition. The end of the warmup condition may be determined according to whichever temperature or time value was utilized to enter the warmup condition. Alternatively or additionally, the determination of the end of the warmup condition may utilize a distinct time or temperature value from the value that initiated the warmup condition. Example and non-limiting determinations of the end of the warmup condition include a temperature value exceeding a threshold, an amount of fuel injected during the warmup operation exceeding a threshold, and/or a time of the warmup condition operations exceeding a threshold. Example and non-limiting determinations of the approaching end of the warmup operations include any warmup determination condition approaching the end of the warmup condition state, a predicted time to exit the warmup condition being below a threshold value, and/or a derivative-based determination that the distance (in any units, including time, temperature, etc.) to the end of the warmup condition is small relative to the speed of approach to the end of the warmup condition.

Example and non-limiting transition operations include a return to normal fueling tables, normal AFR values, and/or any other nominal operations that were adjusted in response to the warmup condition. The transition operations may include rate limiting, smoothing, and/or filtering any change values between the warmup condition operations and nominal operation conditions.

Another example system includes an internal combustion engine having a number of cylinders, where at least one of the cylinders includes a dedicated EGR cylinder, and where the dedicated EGR cylinder includes an EGR displacement volume. The system further includes cylinders from the numbers of cylinders that are not dedicated EGR cylinders each having an exhaust cylinder displacement volume. In certain embodiments, the EGR displacement volume is distinct from the exhaust cylinder displacement volume. Example and non-limiting systems having an EGR displacement volume distinct from the exhaust cylinder displacement volume include a dedicated EGR cylinder having an adjusted bore and/or stroke value, an adjusted valve timing value (e.g. providing a distinct actual displacement volume within the same geometric displacement volume), and/or a piston driving mechanism that provides a different stroke value to the dedicated EGR cylinder.

Example piston driving mechanisms include, without limitation, a swashplate, a wobble plate, a z-crank shaft, a cam-driven piston, and/or a distinct pivot distance around the crankshaft for the dedicated EGR cylinder(s). Where multiple dedicated EGR cylinders are present, each dedicated EGR cylinder may or may not have a distinct displacement volume from the exhaust cylinders and/or from other dedicated EGR cylinders. The following systems are explicitly contemplated: three exhaust cylinders having a first volume and one dedicated EGR cylinder have a second volume (distinct); four exhaust cylinders having a first volume, two dedicated EGR cylinders having a second volume (distinct from the first volume, equal to each other); four exhaust cylinders having a first volume, two dedicated EGR cylinders, one having the first volume and one having a second volume (distinct); four exhaust cylinders having a first volume, two dedicated EGR cylinders, one having a second volume (distinct) and the other having a third volume (distinct). The described embodiments are non-limiting examples. The provided examples each demonstrate embodiments wherein the resulting EGR fraction of the system differs from the simple ratio of the number of dedicated EGR cylinders to the total number of cylinders.

In certain embodiments, the example system further includes a controller that interprets a target EGR fraction, and in response to the target EGR fraction provides a variable displacement command. The system further includes a variable displacement device operationally coupled to the dedicated EGR cylinder and responsive to the variable displacement command. The variable displacement device may be any type known in the art. In certain embodiments, the piston driving mechanisms are known to be adjustable in response to a command—for example and without limitation a swash plate angle change, a cam rotation or position change, and/or a wobble plate adjustment may be utilized to adjust the dedicated EGR cylinder(s) displacement. Additionally or alternatively, a variable valve timing operation on the dedicated EGR cylinder(s) may be utilized to change the effective displacement of the dedicated EGR cylinder(s), and/or a cylinder cutoff device and/or fuel reduction (e.g. stopping or reducing fueling to one of the dedicated EGR cylinders) may be utilized to effectively reduce the EGR fraction by recirculating fresh air or lightly combusted air. Accordingly, some control over the realized EGR fraction of the system is achievable, having the benefit of the disclosures herein, in a system utilizing one or more dedicated EGR cylinders.

Yet another example system is an internal combustion engine having a number of cylinders, where at least one of the cylinders includes a dedicated EGR cylinder. The dedicated EGR cylinder includes an EGR stroke cycle, where the cylinders from the number of cylinders that are not dedicated EGR cylinders each include an exhaust stroke cycle, and where the EGR stroke cycle is distinct from the exhaust stroke cycle. In one example, the exhaust stroke cycle is a 4-stroke cycle and the EGR stroke cycle is a 2-stroke cycle. It can be seen, for example, where a 4-cylinder engine having a single dedicated EGR cylinder is generally 25% EGR (1 recirculated combustion/4 total combustions) where all cylinders operate in a 4-cycle mode. By contrast, a 4-cylinder engine having a single dedicated EGR cylinder is generally 40% EGR (2 recirculated combustion/5 total combustions) where the non-EGR cylinders operate in 4-cycle and the dedicated EGR cylinder operates in a 2-cycle mode. Where the EGR stroke cycle is a stroke schedule, for example 2-stroke for a percentage of the operating time and/or during certain operating conditions, and where some of the portions of the stroke schedule are the same as the exhaust stroke cycle but other portions of the stroke schedule are distinct from the exhaust stroke cycle, the EGR stroke cycle is nevertheless distinct from the exhaust stroke cycle.

Yet another example system includes an internal combustion engine having a number of cylinders, where at least one of the cylinders includes a dedicated EGR cylinder. The dedicated EGR cylinder comprises an EGR stroke cycle, and the cylinders from the number of cylinders that are not dedicated EGR cylinders each include an exhaust stroke cycle. The EGR stroke cycle is selectable between distinct from the exhaust stroke cycle and equal to the exhaust stroke cycle. The system further includes a controller that interprets a target EGR fraction, and in response to the target EGR fraction selects the EGR stroke cycle. In certain embodiments, the controller interprets an engine operating condition (e.g. an engine speed, engine load, engine transient operation indication), and in response to the engine operating condition the controller selects the EGR stroke cycle. In certain embodiments, the system includes a number of dedicated EGR cylinders, where one or more of the dedicated EGR cylinders includes the EGR stroke cycle. In certain embodiments, all of the EGR cylinders include the EGR stroke cycle. In certain embodiments, the EGR stroke cycle and the exhaust stroke cycle are each either a 2-stroke cycle or a 4-stroke cycle at any given time. In certain embodiments, the EGR stroke cycle includes either a 2-stroke cycle or a 4-stroke cycle at any given time, and the EGR stroke cycle is modulated between the 2-stroke cycle and the 4-stroke cycle to create a time averaged EGR rate. In certain embodiments, the controller modulates the EGR stroke cycle to create the time averaged EGR rate.

The schematic flow description which follows provides an illustrative embodiment of performing procedures for providing compositional feedback control of a dedicated EGR system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

An example procedure includes an operation to interpret a hydrogen amount produced by a dedicated EGR cylinder, and to determine a fuel amount for the dedicated EGR cylinder in response to the hydrogen amount. The procedure further includes an operation to fuel the dedicated EGR cylinder in response to the determined fuel amount. The fueling the dedicated EGR cylinder in response to the determined fuel amount includes, without limitation, fueling the dedicated EGR cylinder with the fuel amount required to achieve the hydrogen amount, progressing acceptably toward the fuel amount required to achieve the hydrogen amount, and/or fueling with an amount otherwise limited such as by oxygen-fuel limits, torque production limits, engine vibration limits, intake manifold or EGR system temperature limits, etc.

Example operations to interpret the hydrogen amount include, without limitation, interpreting a CO amount in an exhaust stream of an internal combustion engine including the dedicated EGR cylinder, interpreting a fuel composition value for an internal combustion engine including the dedicated EGR cylinder, and/or interpreting a fuel quality value for an internal combustion engine including the dedicated EGR cylinder. In one example, a calibration of a system can equate field detectable CO to $H_2$, allowing for a feedback response relating to $H_2$. In another example, a fuel composition value is determined (e.g. entered by an operator, automatically by a fueling system, determined from fuel density or other sensor values, etc.) and the amount of $H_2$ generated is modeled according to predetermined performance values.

Yet another example system includes an internal combustion engine having a number of cylinders, where at least one of the cylinders includes a dedicated EGR cylinder. The system further includes a dilute combustion feature that provides ignition at low fluid mass conditions in the dedicated EGR cylinder. For an engine including EGR, at very low load conditions where the mass flow through the system is small, EGR utilization may be suspended or drastically reduced to provide for stable combustion conditions. However, certain dedicated EGR engines do not have the option to eliminate or drastically reduce the EGR fraction, at least not in a manner that preserves the low cost structure and simplified control of a dedicated EGR engine. In certain systems it is desirable to promote stable combustion without providing for a reduction in the EGR flow rate.

An example system includes the dilute combustion feature as a long duration spark system. Another example system includes the dilute combustion feature as a diesel fuel micro pilot system (e.g. providing a very small pilot injection amount of a compression ignited fuel to promote later homogenous combustion). Yet another example system includes the dilute combustion feature comprises as a laser ignition system. Still another example system includes the dilute combustion feature comprises a pre-chamber ignition system (e.g. which may be heated, etc. or otherwise provided with favorable combustion conditions).

Another example system includes an internal combustion engine having a number of cylinders, at least one of the cylinders including a dedicated EGR cylinder. The system further includes a controller that operates the dedicated EGR cylinder(s) at a lean AFR in response to a low fluid mass condition in the dedicated EGR cylinder. The lean AFR may be any value lean of stoichiometric. In certain embodiments, the lean AFR includes a lambda value between 1.17 and 1.5. In certain embodiments, the controller further interprets an EGR target value, and operates the dedicated EGR cylinder(s) at the lean AFR in response to the EGR target value. It can be seen that, running at an effectively lean combustion in the EGR cylinder(s), the effective EGR rate is reduced as the EGR cylinder recirculates fresh air and/or lightly combusted air.

Figure 2:
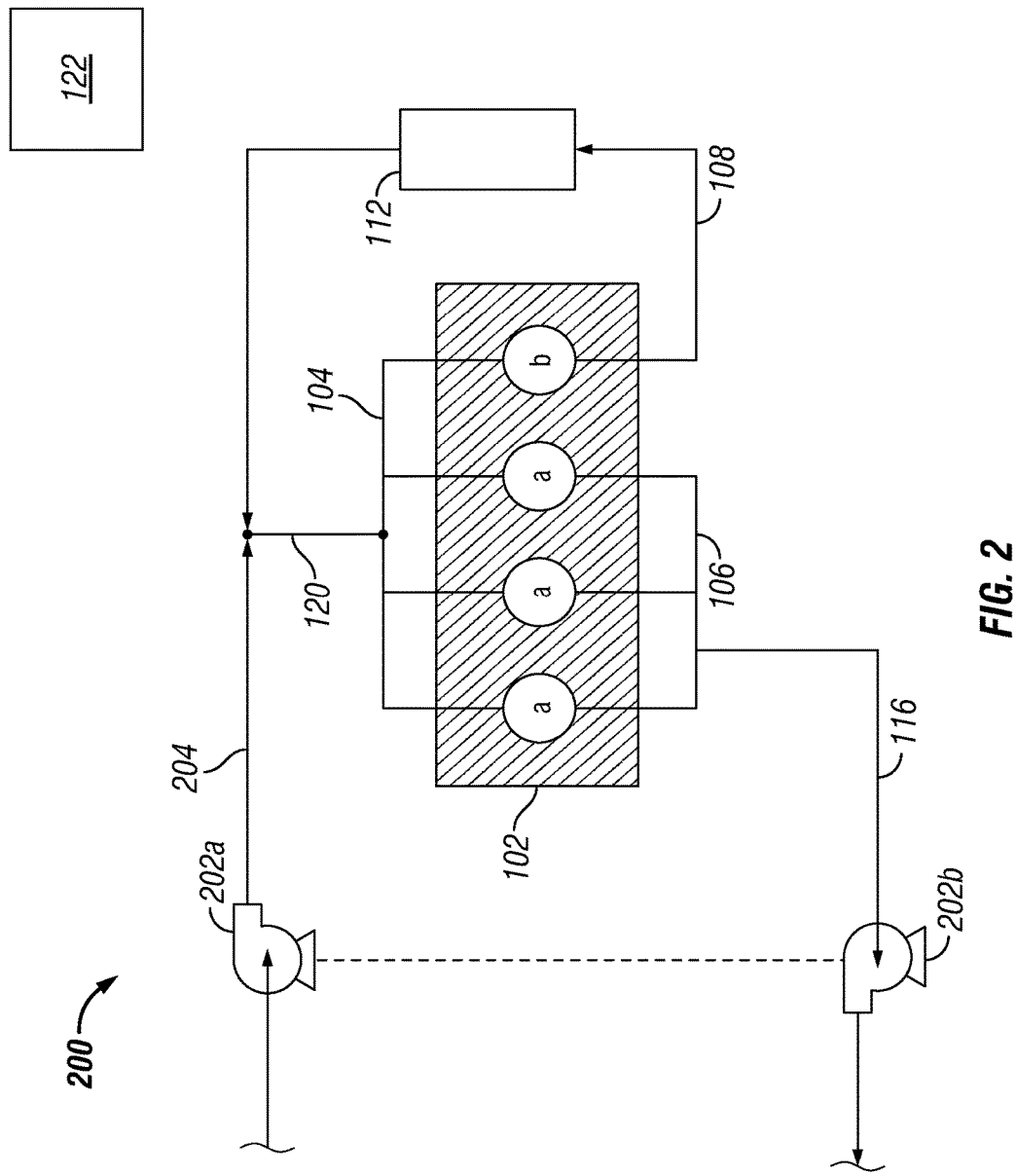
FIG. 2 is a schematic depiction of a system having a dedicated EGR cylinder.

Referencing FIG. 2, another example system 200 includes a compression ignition internal combustion engine 102 having a number of cylinders a, b. At least one of the cylinders is a dedicated EGR cylinder b. The example system 200 is a turbocharged system having a compressor side 202a and a turbine side 202b of the turbocharger. The system 200 further includes compressed inlet air 204 mixing with the EGR stream 108, providing mixed charge air 120 to the intake manifold 104. The hardware depicted in the system 200 is illustrative and non-limiting.

The system 200 further includes a controller 122 that interprets a target EGR fraction, and modulates a fueling amount in the dedicated EGR cylinder in response to the target EGR fraction. In certain embodiments, the controller further adjusts a fueling timing in the dedicated EGR cylinder in response to the fueling amount in the dedicated EGR cylinder having a differential magnitude relative to fueling amounts in the cylinders of the plurality of cylinders that are not the dedicated EGR cylinder. For example, vibration testing or torque generation modeling of the engine 200 may provide timing values for the fueling that better balance the engine 200 during operations when the dedicated EGR cylinder provides an amount of fuel that differs from the other cylinders. It is a mechanical step for one of skill in the art, having the benefit of the disclosures herein, to determine fueling timing adjustment amounts that provide for vibration mitigation from the dedicated EGR cylinder during differential fueling periods.

Figure 3:
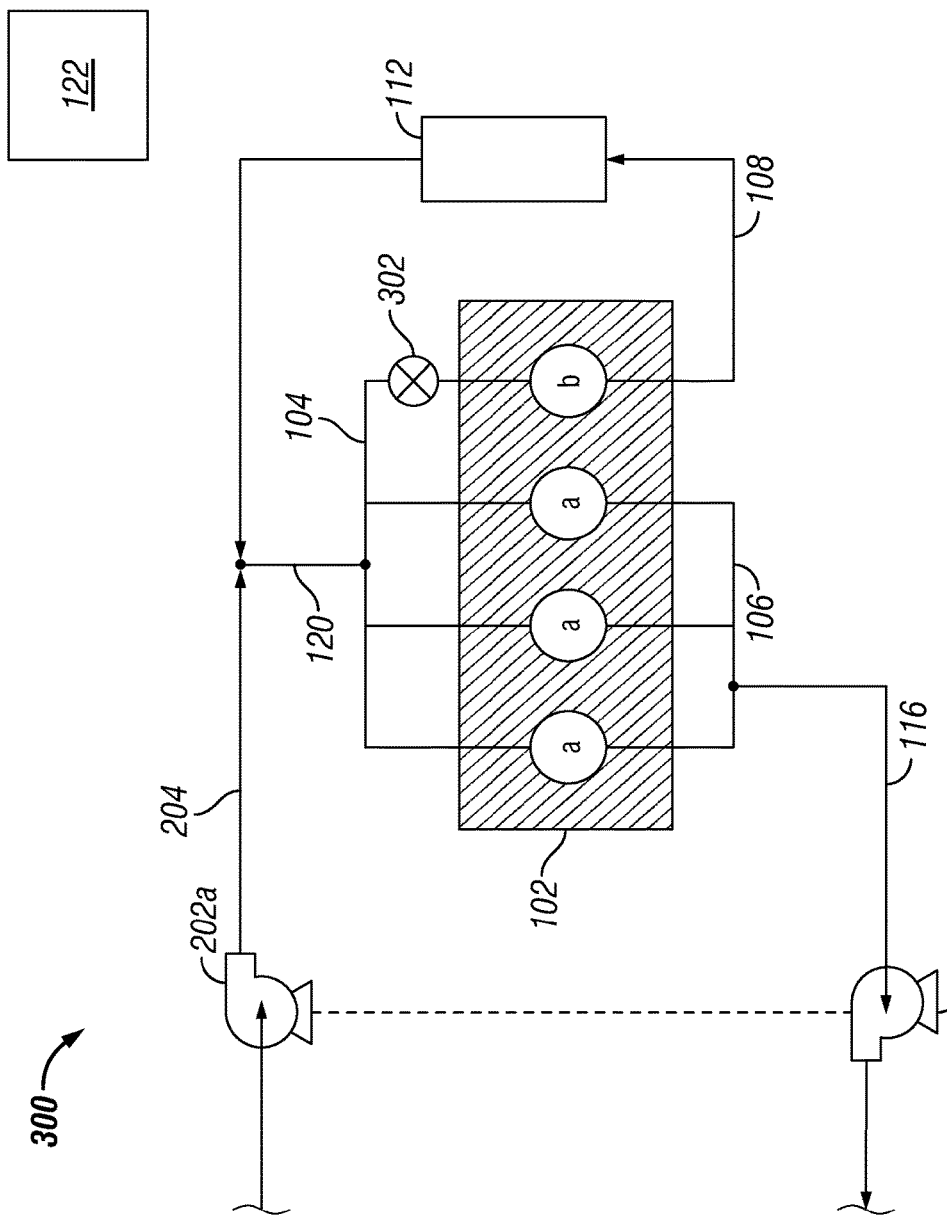
FIG. 3 is a schematic depiction of a system having a dedicated EGR cylinder with a variable inlet control.

Referencing FIG. 3, a system 300 includes an intake valve 302 fluidly coupled to the dedicated EGR cylinder(s) and fluidly isolated from the cylinders that are not the dedicated EGR cylinder. Fluidly isolated, as used herein, indicates that the other cylinders are not downstream of the intake valve 302, and the flow through the other cylinders is not affected by the operations of the intake valve 302 except indirectly through the reduction in flow through the dedicated EGR cylinder. The intake valve 302 may be a butterfly valve, gate valve, globe valve, or any other type of valve, and may include an orifice therethrough.

In certain embodiments, the controller 122 modulates the intake valve 302 in response to the target EGR fraction. Additionally or alternatively, the controller interprets an EGR composition value (e.g. O2 fraction, H2 fraction, CO fraction, unburned HC fraction, etc.), and modulates the intake valve 302 further in response to the EGR composition value.

Figure 4:
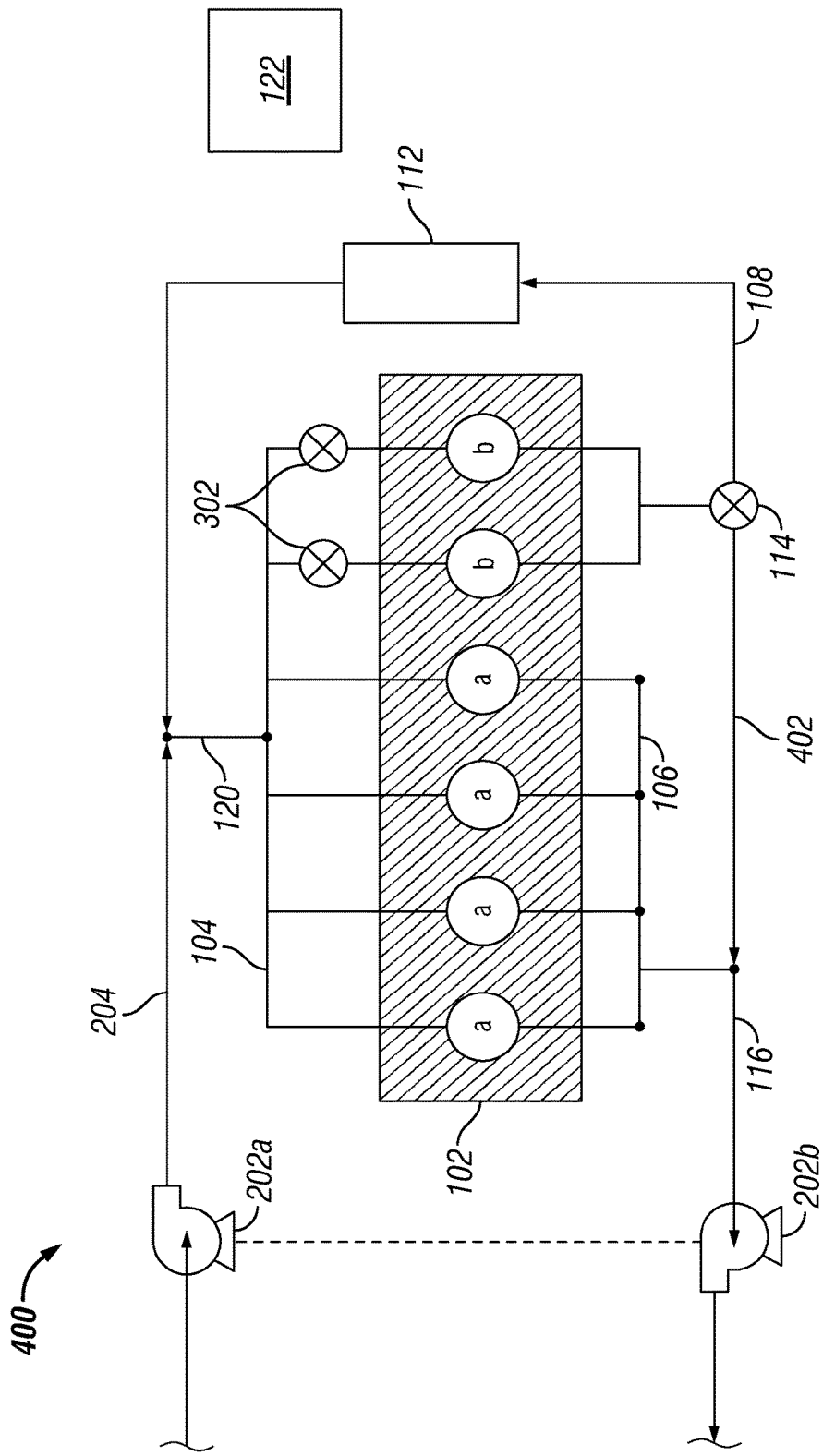
FIG. 4 is a schematic depiction of a system having selectively dedicated EGR cylinders with variable inlet control.

Referencing FIG. 4, a system 400 includes an EGR valve 114 that selectively directs the flow from the dedicated EGR cylinder b between an intake of the engine 120 and an exhaust of the engine 116. The example valve 114 is a three-way valve that provides selectable fractions of dedicated EGR flow to the EGR stream 108 and/or to the exhaust side 402 for addition to the exhaust stream 116. In the example system 400, the exhaust side 402 enters the exhaust of the engine at a position upstream of the turbocharger 202b. Referencing FIG. 5, an example system 500 includes the exhaust side 502 entering the engine exhaust at a position downstream of the turbocharger 202b.

In certain embodiments, the controller 122 further interprets an engine response request value and, in response to the engine response request value exceeding a transient operation threshold value, the controller 122 directs the flow from the dedicated EGR cylinder to the exhaust of the engine. Additionally or alternatively, the controller, in response to the engine response request value exceeding a transient operation threshold value, increases a fraction of the total flow from the dedicated EGR cylinder that flows to the exhaust of the engine.

In certain embodiments, the controller 122 interprets an exhaust temperature target value, and in response to the exhaust temperature target value, reduce a fueling amount in the dedicated EGR cylinder. A reduction in the fueling to the dedicated EGR cylinder can cause a subsequent increase in fueling to the other cylinders and increase the exhaust temperature. Another example controller 122 interprets the exhaust temperature target value, and in response to the exhaust temperature target value, eliminates the fueling amount in the dedicated EGR cylinder. In certain embodiments, the controller 122 reducing or eliminating the dedicated EGR cylinder fueling amount is in response to an elevated exhaust temperature target value—for example during aftertreatment regeneration operations where an exhaust temperature increased above nominal operations is desired.

Figure 5:
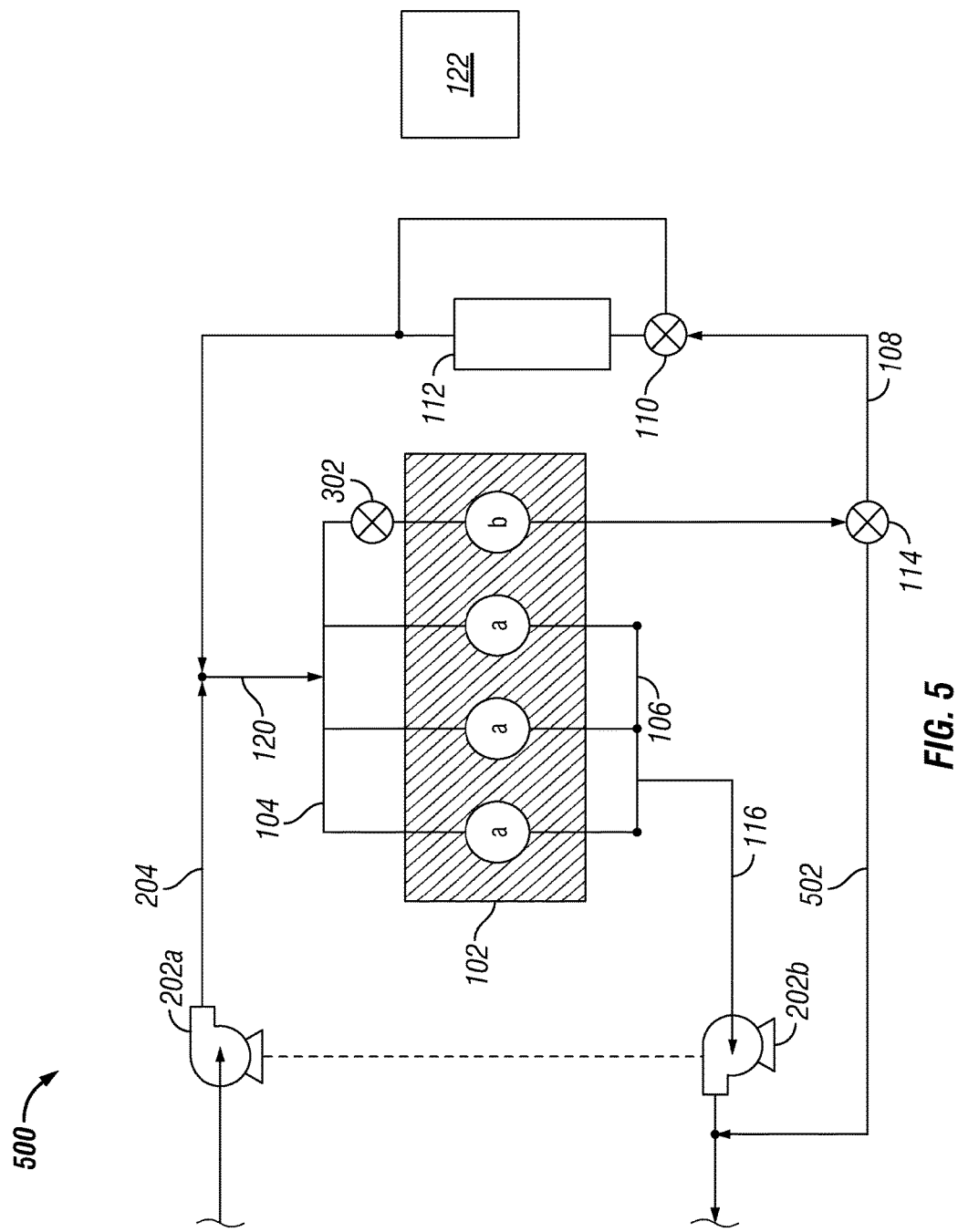
FIG. 5 is a schematic depiction of a system having a selectively dedicated EGR cylinder with variable inlet control.

In certain embodiments, for example referencing FIG. 5, the controller 122 interprets an elevated exhaust temperature target value and engages an EGR cooler bypass valve 110 (illustrated as a three-way valve in the system 500) to assist in elevating the exhaust temperature. In certain embodiments, the controller 122 interprets an elevated exhaust temperature target value and engages a controllable turbocharger (e.g. inducing above nominal backpressure onto the engine 102) to assist in elevating the exhaust temperature. The controllable turbocharger may be a variable geometry turbocharger (VGT) and/or a controllable wastegate turbocharger.

An example set of embodiments includes a system having an internal combustion engine with a dedicated EGR cylinder, where the dedicated EGR cylinder includes a direct injector. The system includes a controller that interprets a warmup condition, and in response to the warmup condition provides a warmup operation command. The direct injector is responsive to the warmup operation command. Certain further embodiments of the system are described following.

An example system includes the dedicated EGR cylinder being a selectively dedicated EGR cylinder. An example warmup operation command includes a retarded injection timing, a stratified injection timing, a predetermined rich fueling amount, and/or a predetermined injection timing that produces a desired amount of $H_2$, unburned HC, and/or CO. An example system includes the engine having non-dedicated EGR cylinders, where the non-dedicated EGR cylinders include a non-direct injector, port fuel injection, and/or lack direct injection. An example system includes the engine having a distinct AFR in the non-dedicated EGR cylinders relative to the one or more dedicated EGR cylinders. An example system includes the dedicated EGR cylinder(s) having port fuel injection, where the port fuel injector is not active during the warmup condition. An example system includes the dedicated EGR cylinder(s) having port fuel injection, where both the port fuel injector and the direct injector provide fuel during the warmup condition. An example system includes an intake of the dedicated EGR cylinder(s) being fluidly isolated from the intake(s) of the non-dedicated EGR cylinder(s). An example system includes the warmup condition being a condition including a cold start condition, a low catalyst temperature condition, a low engine temperature condition, a low engine coolant temperature condition, and/or a low engine oil temperature condition. An example system includes a selectively dedicated EGR cylinder operating as a dedicated EGR cylinder during the warmup condition. Another example system includes the controller further providing a transition operation command in response to the warmup condition and/or an approaching end of the warmup condition.

Another example set of embodiments is a system including an internal combustion engine having a number of cylinders, with at least one of the cylinders being a dedicated EGR cylinder, where the dedicated EGR cylinder includes an EGR displacement volume and where the cylinders that are not dedicated EGR cylinders each have an exhaust cylinder displacement volume that is distinct from the EGR displacement volume. Certain further embodiments of the example system are described following.

An example system further includes a controller that interprets a target EGR fraction, and in response to the target EGR fraction provides a variable displacement command, where the system further includes a variable displacement device operationally coupled to the dedicated EGR cylinder and responsive to the variable displacement command. An example system includes the variable displacement device being a swashplate device, a wobble plate device, a z-crank shaft, and/or a cam-based crank shaft. An example system includes the variable displacement device being a cylinder cutoff device.

Yet another example set of embodiments is a system including an internal combustion engine having a number of cylinders, at least one of the cylinders being a dedicated EGR cylinder, where the dedicated EGR cylinder includes an EGR stroke and where the cylinders that are not dedicated EGR cylinders include an exhaust cycle stroke. The system includes the EGR stroke and the exhaust cycle stroke being distinct from each other. An example system includes the EGR stroke cycle being selectably distinct or the same as the exhaust cycle stroke. Another example system includes a controller that interprets a target EGR fraction, and in response to the target EGR fraction selects the EGR stroke cycle. An example system further includes a controller that interprets an engine operating condition, and selects the EGR stroke cycle in response to the engine operating condition. An example system includes more than one dedicated EGR cylinder, where all or a subset of the dedicated EGR cylinders utilize the EGR stroke. An example system includes one or more EGR cylinders operating in a 2-stroke mode, a 4-stroke mode, selectably between a 2-stroke mode and a 4-stroke mode, and/or a controller that modulates one or more EGR cylinders between a 2-stroke mode and a 4-stroke mode to create a selectable time averaged EGR rate.

Another example system includes an internal combustion engine having a number of cylinders, at least one of the cylinders being a dedicated EGR cylinder, and wherein the system includes a means for providing an EGR fraction that differs from a fraction defined by the ratio of the dedicated EGR cylinders to the total number of cylinders. For example, where 2 of 6 cylinders are dedicated EGR cylinders, an example system includes a means for providing an EGR fraction other than 2/6. Example and non-limiting means for providing an EGR fraction that differs from a fraction defined by the ratio of the dedicated EGR cylinders to the total number of cylinders are described herein. However, any means described throughout the present disclosure are also contemplated herein. Example and non-limiting means include hardware and operations to modulate a valve timing, hardware and operations to modulate a stroke shape and/or length, hardware and operations to change selectably between a 2-stroke operation and a 4-stroke operation for a dedicated EGR cylinder, hardware and operations to modulate a cylinder between normal operation and dedicated EGR operation, and/or hardware and operations to vary a fueling amount in a dedicated EGR cylinder.

Yet another example set of embodiments is a method including an operation to interpret a hydrogen amount produced by a dedicated EGR cylinder, an operation to determine a fuel amount for the dedicated EGR cylinder in response to the hydrogen amount, and an operation to fuel the dedicated EGR cylinder in response to the determined fuel amount. Further example operations of a method are described following.

An example method includes interpreting the hydrogen amount by interpreting a CO amount in an exhaust stream of an internal combustion engine including the dedicated EGR cylinder, interpreting a fuel composition value for an internal combustion engine including the dedicated EGR cylinder, and/or interpreting a fuel quality value for an internal combustion engine including the dedicated EGR cylinder.

Yet another example set of embodiments is a system including an internal combustion engine having a number of cylinders, at least one of the cylinders being a dedicated EGR cylinder, and a dilute combustion feature that provides ignition at low fluid mass conditions in the dedicated EGR cylinder. Example dilute combustion features include, without limitation, a long duration spark system, a diesel fuel micro pilot system, a laser ignition system, and/or a pre-chamber ignition system. The pre-chamber ignition system may include a spark, fuel injection, and/or heater system operationally coupled to the pre-chamber ignition system.

In certain further embodiments, a system includes a controller that operates a dedicated EGR cylinder at a lean AFR in response to a low fluid mass condition in the dedicated EGR cylinder. Example lean AFR values include, without limitation, lambda ($\lambda$) values between 1.17 and 1.5 inclusive. In certain embodiments, an example system includes a controller that interprets an EGR target value, and operates the dedicated EGR cylinder at the lean AFR in response to the EGR target value.

Yet another example set of embodiments is a system including a compression ignition internal combustion engine having a number of cylinders, where at least one of the cylinders is a dedicated EGR cylinder, and a controller that interprets a target EGR fraction and modulates a fueling amount in the dedicated EGR cylinder in response to the target EGR fraction. An example system further includes a controller that adjusts a fuel timing in the dedicated EGR cylinder in response to the fueling amount in the dedicated EGR cylinder having a differential magnitude relative to fueling amounts in the cylinders of the cylinders that are not the dedicated EGR cylinder(s). An example system includes an intake valve fluidly coupled to the dedicated EGR cylinder(s) and fluidly isolated from the cylinders that are not dedicated EGR cylinder(s). An example system includes a controller that modulates the intake valve in response to the target EGR fraction. An example system includes a controller that interprets an EGR composition value, and modulates the intake valve further in response to the EGR composition value.

Another example system includes an EGR valve that selectively directs the flow from the dedicated EGR cylinder between an intake of the engine and an exhaust of the engine. An example system further includes the exhaust of the engine accepting the dedicated EGR flow at either a position upstream of the turbocharger and/or downstream of the turbocharger. An example system further includes a controller that interprets an engine response request value, and in response to the engine response request value exceeding a transient operation threshold value, directs the flow from the dedicated EGR cylinder to the exhaust of the engine, increasing a fraction of the total flow from the dedicated EGR cylinder that flows to the exhaust of the engine. An example system further includes the controller interpreting an engine response request value, and in response to the engine response request value exceeding a transient operation threshold value, directs the flow from the dedicated EGR cylinder to the exhaust of the engine. An example system includes the controller interpreting an exhaust temperature target value, and in response to the exhaust temperature target value, reduces a fueling amount in the dedicated EGR cylinder. An example system includes the controller interpreting an exhaust temperature target value, and in response to the exhaust temperature target value, eliminating a fueling amount in the dedicated EGR. An example system includes reducing and/or eliminating the fueling in the dedicated EGR cylinder in response to an elevated exhaust temperature target value. An example system includes an EGR cooler, and a means for utilizing the EGR cooler to assist in elevating the exhaust temperature. An example system further including a controllable turbocharger, and a means for utilizing the controllable turbocharger to assist in elevating the exhaust temperature. An example controllable turbocharger includes a VGT and/or a controllable waste gate.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine having a plurality of cylinders;
   at least one of the plurality of cylinders comprising a dedicated EGR cylinder;
   wherein the dedicated EGR cylinder comprises an EGR displacement volume, wherein the cylinders from the plurality of cylinders that are not dedicated EGR cylinders each comprise an exhaust cylinder displacement volume, and wherein the EGR displacement volume is distinct from the exhaust cylinder displacement volume; and
   a controller structured to interpret a target EGR fraction, and in response to the target EGR fraction to provide a variable displacement command, the system further comprising a variable displacement device operationally coupled to the dedicated EGR cylinder and responsive to the variable displacement command.

2. The system of claim 1, wherein the variable displacement device comprises a device selected from the devices consisting of: a swashplate device, a wobble plate device, a z-crank shaft, and a cam-based crank shaft.

3. The system of claim 1, wherein the system further comprises a plurality of dedicated EGR cylinders, and wherein the variable displacement device comprises a cylinder cutoff device.

4. A system, comprising:
   an internal combustion engine having a plurality of cylinders;
   at least one of the plurality of cylinders comprising a dedicated EGR cylinder;
   wherein the dedicated EGR cylinder comprises an EGR stroke cycle, wherein the cylinders from the plurality of cylinders that are not dedicated EGR cylinders each comprise an exhaust stroke cycle, and wherein the EGR stroke cycle is distinct from the exhaust stroke cycle.

5. The system of claim 4, wherein the exhaust stroke cycle comprises a 4-stroke cycle, and wherein the EGR stroke cycle comprises a 4-stroke cycle during at least a portion of available engine operating conditions.

6. A system, comprising:
   an internal combustion engine having a plurality of cylinders;
   at least one of the plurality of cylinders comprising a dedicated EGR cylinder; and
   wherein the dedicated EGR cylinder comprises an EGR stroke cycle, wherein the cylinders from the plurality of cylinders that are not dedicated EGR cylinders each comprise an exhaust stroke cycle, and wherein the EGR stroke cycle is selectable between distinct from the exhaust stroke cycle and equal to the exhaust stroke cycle.

7. The system of claim 6, further comprising a controller structured to interpret a target EGR fraction, and in response to the target EGR fraction to select the EGR stroke cycle.

8. The system of claim 6, further comprising a controller structured to interpret an engine operating condition, and in response to the engine operating condition to select the EGR stroke cycle.

9. The system of claim 6, further comprising a plurality of the dedicated EGR cylinders.

10. The system of claim 9, wherein the EGR stroke cycle and the exhaust stroke cycle both comprise one of a 2-stroke cycle and a 4-stroke cycle at any given time.

11. The system of claim 6, wherein the EGR stroke cycle and the exhaust stroke cycle both comprise one of a 2-stroke cycle and a 4-stroke cycle at any given time.

12. The system of claim 11, wherein the controller is further structured to modulate the EGR stroke cycle to create a time averaged EGR rate.

13. The system of claim 6, wherein the EGR stroke cycle comprises one of a 2-stroke cycle and a 4-stroke cycle at any given time, and wherein the EGR stroke cycle is modulated between the 2-stroke cycle and the 4-stroke cycle to create a time averaged EGR rate.

14. A system, comprising:
   an internal combustion engine having a plurality of cylinders;
   at least one of the plurality of cylinders comprising a dedicated EGR cylinder; and
   a controller structured to provide an EGR fraction that differs from the fraction defined by the ratio of the dedicated EGR cylinders to the total number of cylinders.

15. The system of claim 14, wherein the controller is further structured to modulate a valve timing in the dedicated EGR cylinder in response to the EGR fraction.

16. A system, comprising:
   a compression ignition internal combustion engine having a plurality of cylinders;
   at least one of the plurality of cylinders comprising a dedicated EGR cylinder;
   a controller structured to interpret a target EGR fraction, and to modulate a fueling amount in the dedicated EGR cylinder in response to the target EGR fraction.

17. The system of claim 16, wherein the controller is further structured to adjust a fueling timing in the dedicated EGR cylinder in response to the fueling amount in the dedicated EGR cylinder having a differential magnitude relative to fueling amounts in the cylinders of the plurality of cylinders that are not the dedicated EGR cylinder.

18. The system of claim 16, further comprising an intake valve fluidly coupled to the dedicated EGR cylinder(s) and fluidly isolated from the cylinders of the plurality of cylinders that are not the dedicated EGR cylinder.

19. The system of claim 18, wherein the controller is further structured to modulate the intake valve in response to the target EGR fraction.

20. The system of claim 19, wherein the controller is further structured to interpret an EGR composition value, and to modulate the intake valve further in response to the EGR composition valve.

21. The system of claim 16, further comprising an EGR valve structured to selectively direct the flow from the dedicated EGR cylinder between an intake of the engine and an exhaust of the engine.

22. The system of claim 21, wherein the exhaust of the engine comprises one of a position upstream of a turbine exhaust and a position downstream of the turbine exhaust.

23. The system of claim 21, wherein the controller is further structured to interpret an engine response request value and, in response to the engine response request value exceeding a transient operation threshold value direct the flow from the dedicated EGR cylinder to the exhaust of the engine, increasing a fraction of the total flow from the dedicated EGR cylinder that flows to the exhaust of the engine.

24. The system of claim 21, wherein the controller is further structured to interpret an engine response request value and, in response to the engine response request value exceeding a transient operation threshold value, to direct the flow from the dedicated EGR cylinder to the exhaust of the engine.

25. The system of claim 21, wherein the controller is further structured to interpret an exhaust temperature target value, and in response to the exhaust temperature target value, to reduce a fueling amount in the dedicated EGR cylinder.

26. The system of claim 25, wherein the reducing the fueling amount is in response to an elevated exhaust temperature target value.

27. The system of any claim 25, further comprising an EGR cooler, and a means for utilizing the EGR cooler to assist in elevating the exhaust temperature.

28. The system of any one of claim 25, further comprising a controllable turbocharger, and a means for utilizing the controllable turbocharger to assist in elevating the exhaust temperature.

29. The system of claim 28, wherein the controllable turbocharger comprises one of a VGT and a controllable wastegate.

30. The system of claim 21, wherein the controller is further structured to interpret an exhaust temperature target value, and in response to the exhaust temperature target value, to eliminate a fueling amount in the dedicated EGR cylinder.

31. The system claim 30, wherein the eliminating the fueling amount is in response to an elevated exhaust temperature target value.

32. The system of claim 31, further comprising an EGR cooler, and a means for utilizing the EGR cooler to assist in elevating the exhaust temperature.

33. The system of any one of claim 31, further comprising a controllable turbocharger, and a means for utilizing the controllable turbocharger to assist in elevating the exhaust temperature.

34. The system of claim 33, wherein the controllable turbocharger comprises one of a VGT and a controllable wastegate.

* * * * *